(12) United States Patent
Walker

(10) Patent No.: US 10,151,320 B2
(45) Date of Patent: Dec. 11, 2018

(54) COMPRESSOR AND GAS TURBINE

(71) Applicant: MITSUBISHI HEAVY INDUSTRIES, LTD., Tokyo (JP)

(72) Inventor: Thomas Walker, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 57 days.

(21) Appl. No.: 14/907,987

(22) PCT Filed: Feb. 12, 2014

(86) PCT No.: PCT/JP2014/053149
§ 371 (c)(1),
(2) Date: Jan. 27, 2016

(87) PCT Pub. No.: WO2015/056456
PCT Pub. Date: Apr. 23, 2015

(65) Prior Publication Data
US 2016/0169241 A1    Jun. 16, 2016

(30) Foreign Application Priority Data
Oct. 17, 2013   (JP) .................. 2013-216484

(51) Int. Cl.
*F02C 6/08*   (2006.01)
*F04D 27/02*   (2006.01)
(Continued)

(52) U.S. Cl.
CPC .............. *F04D 27/023* (2013.01); *F02C 6/08* (2013.01); *F02C 7/08* (2013.01); *F04D 29/522* (2013.01); *F04D 27/0215* (2013.01)

(58) Field of Classification Search
CPC .. F04D 27/023; F04D 29/522; F04D 27/0215; F02C 6/08
See application file for complete search history.

(56) References Cited

U.S. PATENT DOCUMENTS

| 4,844,689 A * | 7/1989 | Seed .................. F01D 9/041 |
| | | 415/169.1 |
| 5,209,633 A | 5/1993 | McGreehan et al. |
| 5,531,565 A * | 7/1996 | Meindl ................. F04D 29/541 |
| | | 415/144 |

FOREIGN PATENT DOCUMENTS

| JP | 63-85299 | 4/1988 |
| JP | 7-63199 | 3/1995 |

(Continued)

OTHER PUBLICATIONS

First Office Action dated Jan. 17, 2017 in corresponding Chinese Application No. 201480041978.0 (with English translation).
(Continued)

*Primary Examiner* — Gerald L Sung
*Assistant Examiner* — William Breazeal
(74) *Attorney, Agent, or Firm* — Wenderoth, Lind & Ponack, L.L.P.

(57) ABSTRACT

A compressor includes a rotor; a rotor casing surrounding the rotor from an outer circumferential side of the rotor and defining a main flow passage of a fluid between the rotor and the rotor casing; an extraction-chamber casing at an outer circumferential side of the rotor casing, and defining an extraction chamber in communication with the main flow passage between the rotor casing and the extraction-chamber casing; and an extraction nozzle connected to the extraction-chamber casing from an outer circumferential side of the extraction-chamber casing and configured to guide the fluid inside the extraction chamber to an outside of the compressor. A gap in a radial direction between the extraction-chamber casing and the rotor casing is larger at a first side of the extraction nozzle in a rearward rotation direction of the rotor than at a second side of the extraction nozzle in a forward rotation direction of the rotor.

7 Claims, 4 Drawing Sheets

(51) Int. Cl.
  *F02C 7/08*  (2006.01)
  *F04D 29/52*  (2006.01)

(56)  References Cited

FOREIGN PATENT DOCUMENTS

| JP | 8-74603 | 3/1996 |
|----|---------|--------|
| JP | 2012-180749 | 9/2012 |
| JP | 2013-72418 | 4/2013 |
| JP | 2013-194513 | 9/2013 |
| JP | 2013-204545 | 10/2013 |
| JP | 2014-145265 | 8/2014 |

OTHER PUBLICATIONS

International Search Report dated May 13, 2014 in corresponding International Application No. PCT/JP2014/053149.
Written Opinion of the International Searching Authority dated May 13, 2014 in corresponding International Application No. PCT/JP2014/053149 (with English Translation).

* cited by examiner

COMPRESSOR AND GAS TURBINE

CROSS-REFERENCE TO RELATED APPLICATION

Priority is claimed from Japanese Patent Application No. 2013-216484 filed Oct. 17, 2013, the contents of which are incorporated herein by reference.

TECHNICAL FIELD

The present invention is related to a compressor provided with a rotor that rotates about an axis thereof and a casing that surrounds the rotor, and a gas turbine provided with the same.

BACKGROUND ART

As a type of rotary machine, a compressor provided with a rotor that rotates about an axis thereof and compresses a gas such as air, and a casing surrounding the rotor. This compressor employs an extraction structure for guiding a part of the gas compressed by the rotor to the outside of the compressor.

For example, Japanese Unexamined Patent Application, First Publication No. 2012-180749 discloses a compressor that employs such extraction structure. An extraction chamber that communicates with a main flow passage of the air (compressed air) and a pipe that guides the air in the extraction chamber to an outside of the compressor are formed in the casing of this compressor. The extraction chamber is an annular space centering around the rotor. Furthermore, the pipe extends radially outward from the extraction chamber with respect to the rotor.

In the compressor employing the extraction structure, the air, which is extracted to the interior of the extraction chamber from the main flow passage, flows so as to swirl in a circumferential direction with a rotation of the rotor.

Problems to be Solved by the Invention

The inventors found that the flow rate of the air in a circumferential direction becomes uneven in the vicinity of the pipe in an interior of the extraction chamber by the analysis using CFD (Computational Fluid Dynamics). Specifically, a local mass flow rate of air tends to increase in a forward side of the pipe in the interior of the extraction chamber in the rotation direction of the rotor.

When pulsation caused by the unevenness of the flow rate of the air occurs, stall of the air flow occurs in the vicinity of the tip of blades disposed downstream of a communication passage with which the extraction chamber and the main passage are connected. Thus, the surge is generated in the entire flow of the compressed air. Then, the operating efficiency of the compressor is decreased by the stall and surge.

In particular, when the number of pipes is reduced for the purpose of, for example, weight reduction, the possibility of the occurrence of surge increases due to the increase of the unevenness of the flow rate of the compressed air which is extracted. In other words, the surge margin is reduced.

SUMMARY OF THE INVENTION

The purpose of the present invention is to provide a compressor that can suppress a decrease in operation efficiency of the compressor by reducing the unevenness of the flow rate of the fluid in the vicinity of an extraction nozzle.

Means for Solving the Problem

A first aspect of the present invention provides a compressor including: a rotor rotating about an axis thereof; a rotor casing surrounding the rotor from an outer circumferential side of the rotor and forming a main flow passage of a fluid between the rotor; an extraction-chamber casing provided at an outer circumferential side of the rotor casing, and forming an extraction chamber that communicates with the main flow passage between the rotor casing; and an extraction nozzle connected to the extraction-chamber casing from an outer circumferential side of the extraction-chamber casing and guiding the fluid inside the extraction chamber to an outside of the compressor, wherein a gap in a radial direction between the extraction-chamber casing and the rotor casing is larger at a side of a position where the extraction nozzle is provided in a rearward rotation direction of the rotor than at a side of the position where the extraction nozzle is provided in the forward rotation direction of the rotor.

According to the above structure, an area of the flow passage becomes small so as to correspond to a decrease in the flow rate of the fluid in the side of the extraction nozzle in the forward rotation direction of the rotor, and the area of the flow passage becomes large so as to correspond to an increase in the flow rate of the fluid in the side of the extraction nozzle in the rearward rotation direction. Accordingly, the unevenness of the flow rate of the fluid in the vicinity of the extraction nozzle can be reduced, and the stalling of the flow occurring in the vicinity of the tip of the blade can be prevented. By the stalling being prevented, a surge generated in an entire flow of the fluid is prevented, and the reduction of the operation efficiency of the compressor can be suppressed.

Since the unevenness of the fluid caused by the extraction nozzle is reduced, the number of the extraction nozzles can be reduced, and thus weight of the compressor and the production cost thereof can be reduced.

The gap, in the radial direction between the extraction-chamber casing and the rotor casing and at the side of the extraction nozzle in the rearward rotation direction, may be formed so as to become gradually larger toward the forward rotation direction of the rotor.

According to the above structure, a shape is formed so as to correspond to the flow rate of the fluid that gradually increases, and the evenness of the flow rate of the fluid can be further improved.

The gap, in the radial direction between the extraction-chamber casing and the rotor casing and at the side of the extraction nozzle in the forward rotation direction, may be formed so as to become gradually smaller toward the rearward rotation direction of the rotor.

According to the above structure, a shape is formed so as to correspond to the flow rate of the fluid that gradually decreases, and the evenness of the flow rate of the fluid can be further improved.

An inner circumferential surface of the extraction nozzle and the outer circumferential surface in the radial direction of the extraction chamber may be connected with a smooth curve surface that is convex toward the flow passage of the fluid.

According to the above structure, a flaking of the fluid flowing through the extraction chamber can be prevented, and the fluid can be smoothly introduced to the extraction nozzle.

A gas turbine of another aspect according to the present invention for achieving the above object is provided with: any one of the above compressors configured to compress an air as the fluid by the rotation of the rotor; a combustor generating combustion gas by burning a fuel in a compressed air compressed by the compressor; and a turbine driven by the combustion gas from the combustor.

Effects of the Invention

According to the above structure, unevenness of the flow rate of the fluid in the vicinity of the extraction nozzle can be reduced, and the stalling of the flow occurring in the vicinity of the tip of the blade can be prevented. By the stalling being suppressed, the surge generated in an entire flow of the fluid is suppressed, and the reduction of the operation efficiency of the compressor can be suppressed.

EMBODIMENTS OF THE INVENTION

Hereinafter, a gas turbine provided with a compressor of an embodiment of the present invention will be explained with reference to the drawings.

Figure 1:
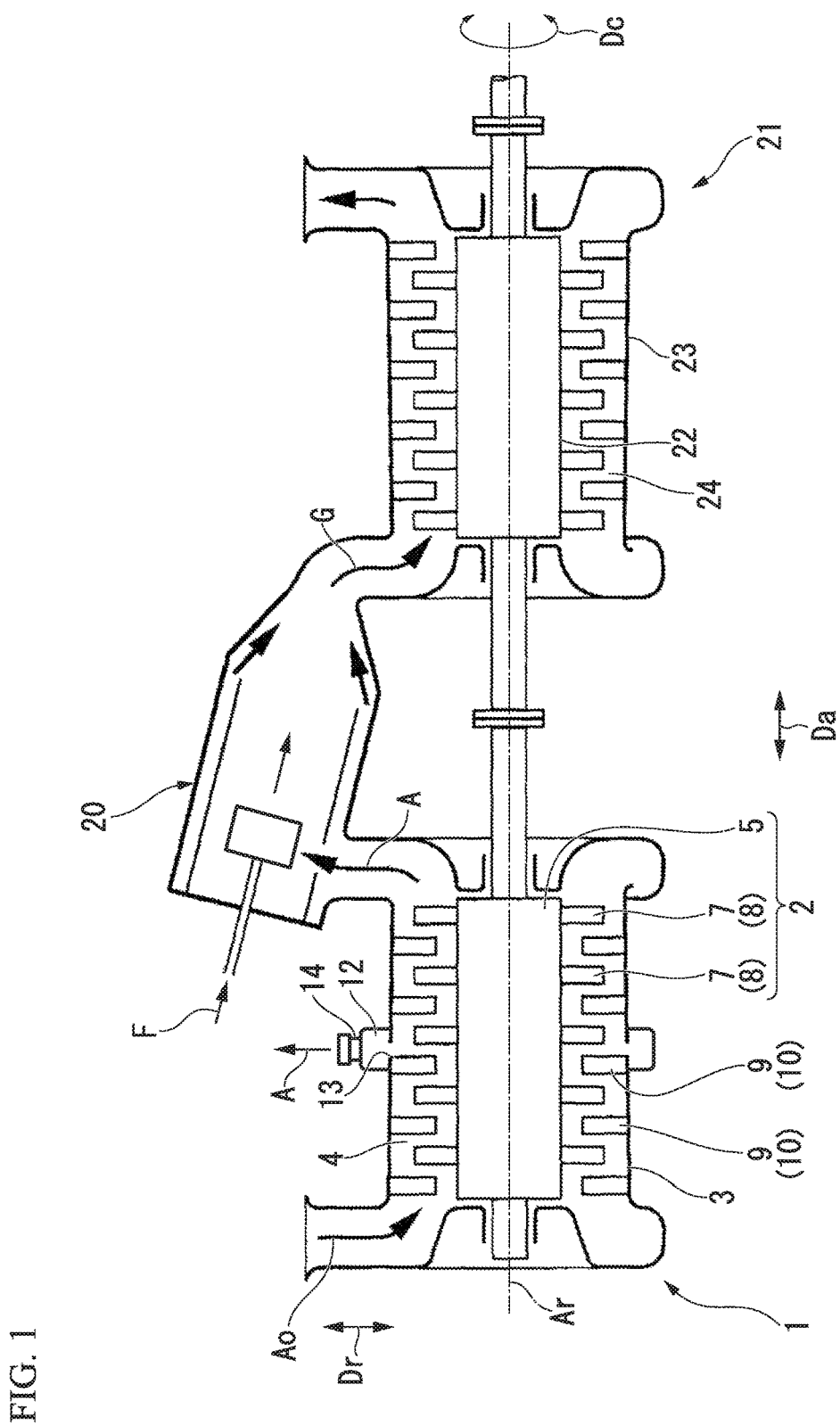
FIG. 1 is a cutaway side view of a main portion of a gas turbine of an embodiment of the present invention.

The gas turbine of the present embodiment is provided with, as shown in FIG. 1, the compressor 1 generating a compressed air A by compressing an ambient air Ao, a plurality of combustors 20 generating a combustion gas G by mixing a fuel F supplied from a fuel supply source with the compressed air A and then by burning them, and a turbine 21 driven by the combustion gas G. In addition, hereinafter, the compressed air A is defined as an air A.

The compressor 1 includes a rotor 2 rotating about a rotation axis Ar, and a casing 3 having a cylindrical shape and covering the rotor 2, and the turbine 21 includes a rotor 22 rotating about the rotation axis Ar, and a casing 23 having a cylindrical shape and covering the rotor 22. The rotor 2 of the compressor 1 and the rotor 22 of the turbine 21 rotate about the same rotation axis Ar, and are linked to each other. The cylindrical casing 3 of the compressor 1 together with the rotor 2 of the compressor 1 form a main flow passage 4 through which the air A flows. Also, the cylindrical casing 23 together with the rotor 22 of the turbine 21 form a main flow passage 24 through which the combustion gas G flows. The plurality of combustors 20 are fixed to the turbine casing 23 at equal intervals to each other in a circumferential direction Dc centering around the rotation axis Ar.

In addition, hereinafter, a direction in which the rotation axis Ar extends is defined as an axial direction Da. Also, a radial direction with reference to the rotation axis Ar is defined as a radial direction Dr. In this radial direction Dr, a direction away from the rotation axis Ar is defined as a radially-outward side. In this radial direction Dr, a direction toward the rotation axis Ar is defined as a radially-inward side. Also, in the axial direction Da, a compressor 1 side with reference to the turbine 21 is defined as an upstream side, and a turbine 21 side with reference to the compressor 1 is defined as a downstream side.

Figure 3:
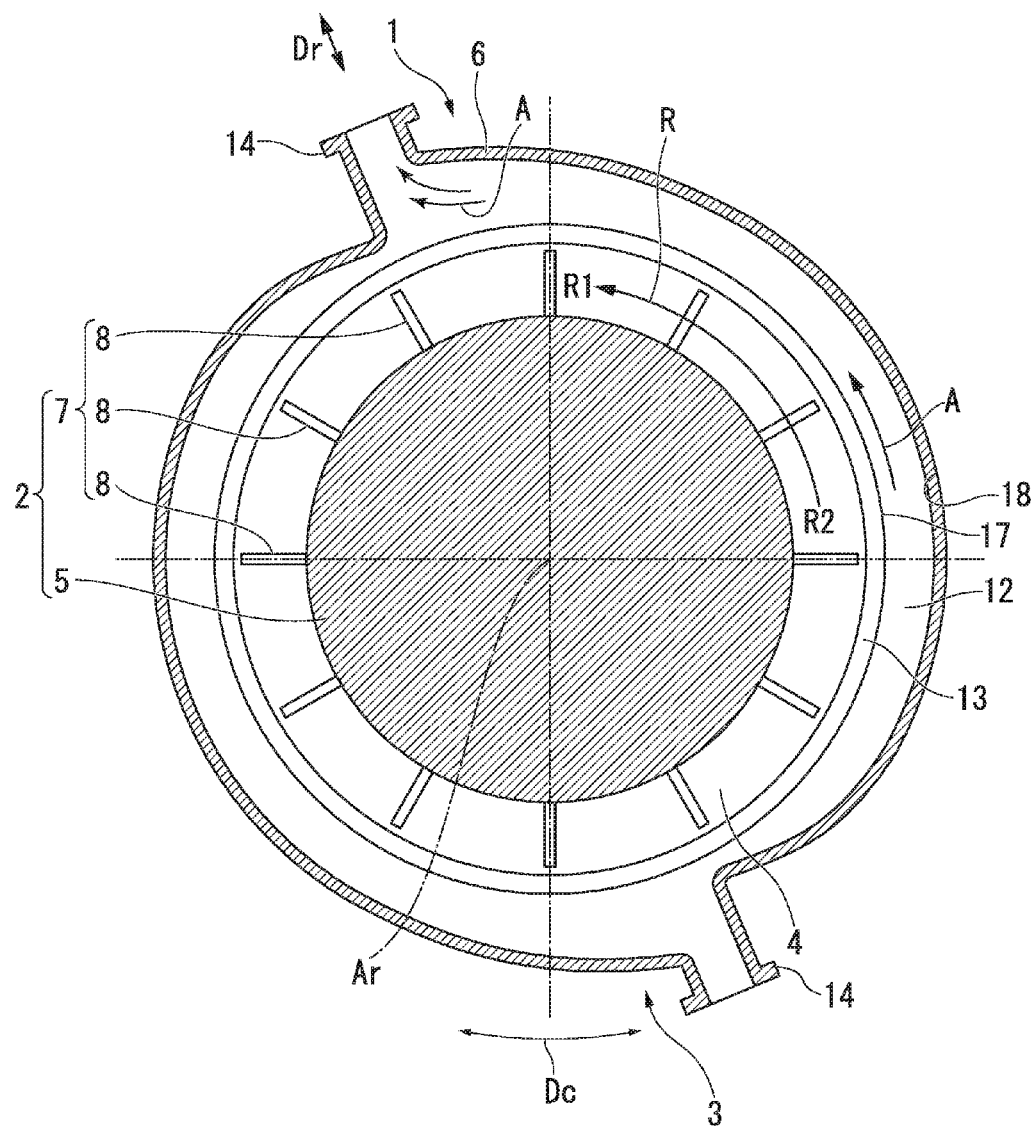
FIG. 3 is a cross-sectional view at II-II in FIG. 2.

In the present embodiment, a rotation direction of the rotor 2 is defined as a rotation direction R. In the rotation direction R, as shown in FIG. 3, a forward rotation direction is defined as R1, and a rearward rotation direction is defined as R2.

Figure 2:
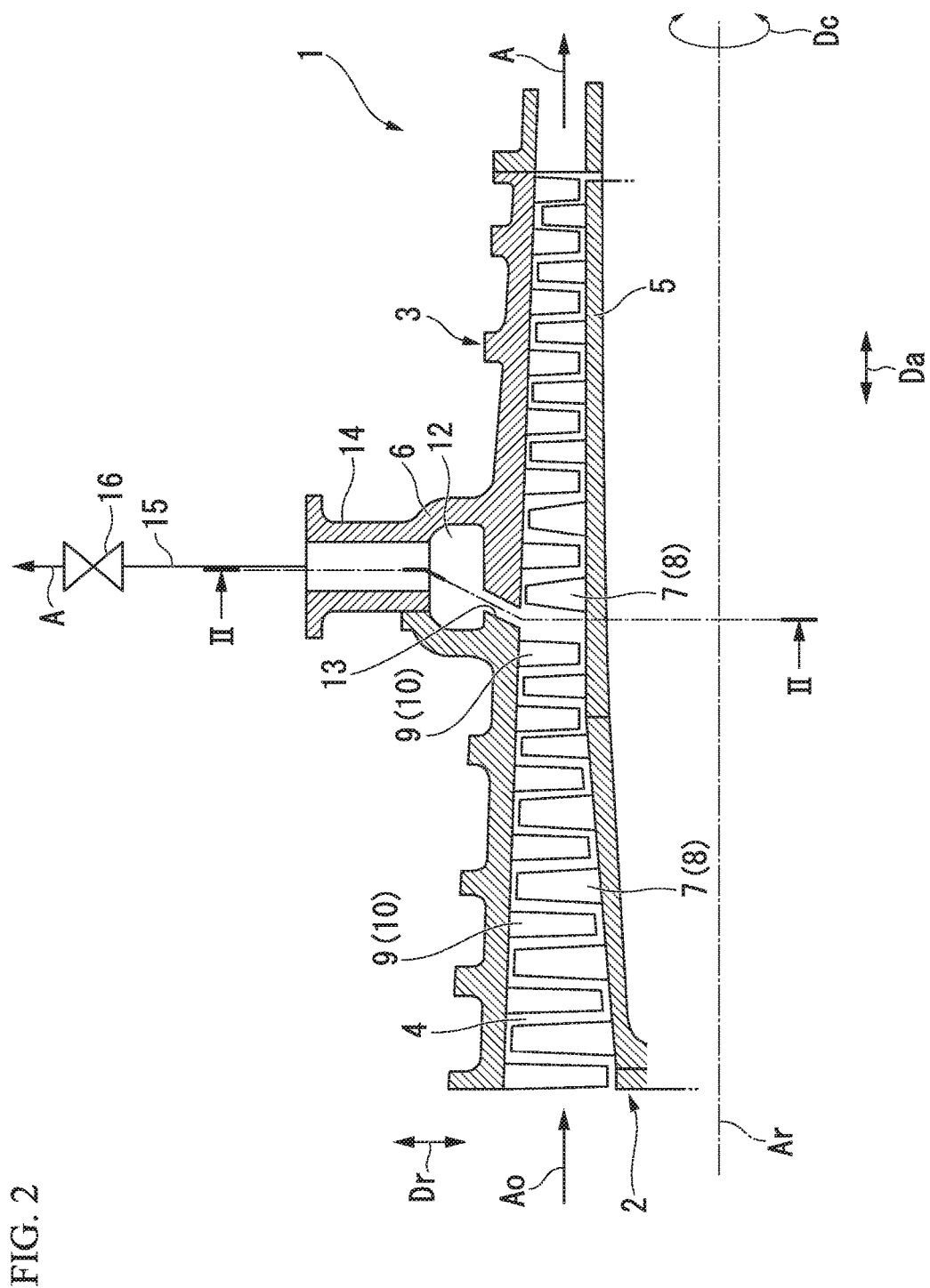
FIG. 2 is a cross-sectional view of the main portion of the gas turbine of the embodiment of the present invention.

As shown in FIG. 2, the compressor 1 is a multi-stage axial-flow compressor. The rotor 2 includes a rotor body 5 extending in the axial direction Da and centering around the rotation axis Ar, and a plurality of blade stages 7 fixed on an outer circumference of the rotor body 5 and arranged in the axial direction Da. On an inner circumferential side of the rotor casing 3, a vane stage 9 is fixed at the upstream position of each of the blade stages 7.

One-vane stage 9 has a plurality of vanes 10. These vanes 10 are arranged in the circumferential direction Dc centering around the rotation axis Ar, and form one-vane stage 9. Also, one-blade stage 7 has a plurality of blades 8. These blades 8 are arranged in the circumferential direction Dc centering around the rotation axis Ar, and form one-blade stage 7.

In the outer circumferential side of the rotor casing 3, an extraction-chamber casing 6 that forms an extraction chamber 12 between the rotor casing 3 is provided. The extraction chamber 12 forms an annular space centering around the rotation axis Ar. A communication passage 13 is formed between the flow passage 4 and the extraction chamber 12, and communicates between the flow passage 4 and the extraction chamber 12.

In the extraction-chamber casing 6, two extraction nozzles 14 for guiding the air A inside the extraction chamber 12 to the outside of the compressor are formed. The present embodiment forms an extraction structure by the above extraction chamber 12, the communication passage 13, and the extraction nozzles 14.

The communication passage 13 is formed in an annular shape centering around the rotation axis Ar and is a slit that is cut toward the radially-outward side, and is formed at radially-inward side of the extraction chamber 12. An opening at the main flow passage 4 side of the communication passage 13 is positioned, in the axial direction Da, between the vane stage 9 and the blade stage 7 which are adjacent to each other in the axial direction Da.

The plurality of extraction nozzles 14 are arranged in equal intervals in the circumferential direction centering around the rotation axis Ar. In other words, the extraction nozzles 14 of the present embodiment are arranged at intervals of 180° in the circumferential direction. The extraction nozzles 14 extend toward the radially-outward side from the extraction chamber 12. To each of the nozzles 14, an extraction pipe 15 guiding the air A to the desired location from the extraction nozzle 14 is connected. This extraction pipe 15 is equipped with a flow-rate control valve 16 controlling the air flow rate to be extracted.

As shown in FIG. 3, when comparing a side of the extraction nozzle 14 in the forward rotation direction R1 of the rotor 2 (the downstream side in the flow direction of the air A) with a side of the extraction nozzle 14 in the rearward rotation direction R2 of the rotor 2 (the upstream side in the flow direction of the air A), the extraction chamber 12 of the present embodiment is formed so as to provide a flow passage area being larger at the side of the extraction nozzle 14 in the rearward rotation direction R2 than at the side of the extraction nozzle 14 in the forward rotation direction R1, when seen the flow passage area from the circumferential direction.

In other words, the gap, in radial direction between a radially-inward surface 17 of the casing of the extraction chamber 12 and a radially-outward surface 18 of the rotor casing 3, becomes larger at the side of the extraction nozzle 14 in the rearward rotation direction R2 than at the side of the extraction nozzle 14 in the forward rotation direction R1 of the rotor 2.

Figure 4:
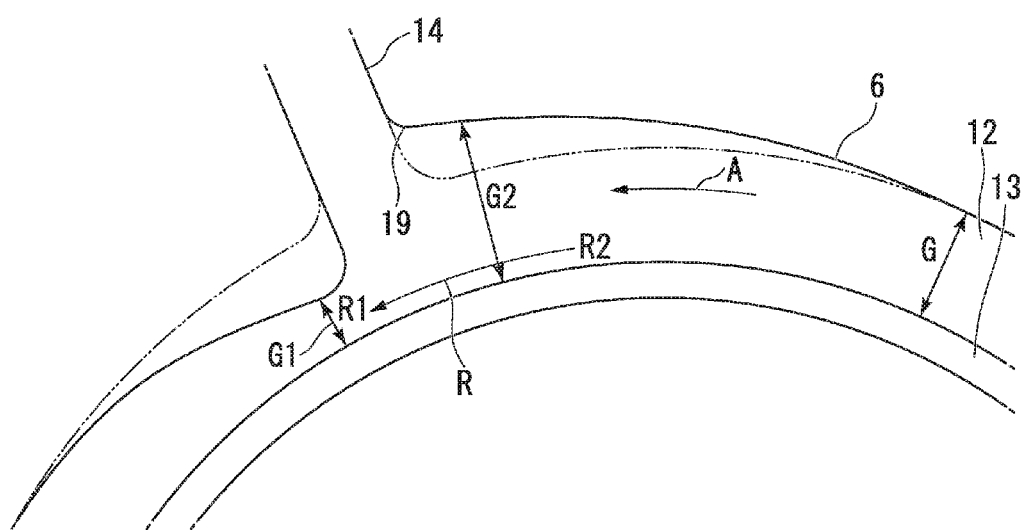
FIG. 4 is an enlarged view of III portion in FIG. 3.

As shown in FIG. 4, when a gap in the radial direction between the rotor casing 3 and the casing of the extraction chamber 12 at a position separated from two nozzles 14 is defined as G, a gap G1 at the side of the extraction nozzle 14 in the forward rotation direction R1 of the rotor 2 is smaller than G. A gap G2 at the rearward rotation direction R2 side of the extraction nozzle 14 is larger than G. The size of gap G1 and the size of the gap G2 can be adjusted appropriately according to the flow rate of the air A in the extraction chamber 12, which is determined by analysis by CFD.

The gap, in the radial direction between the casing of the extraction chamber 12 and the rotor casing 3 and at the rearward rotation direction R2 side of the extraction nozzle 14, is formed so as to become gradually larger toward the forward rotation direction R1 of the rotor 2. In other words, the shape of the casing of the extraction chamber 12 at the rearward rotation direction R2 side of the extraction nozzle 14 is formed so as to provide a flow passage area becoming gradually larger toward the forward rotation direction R1.

The gap, in the radial direction between the casing of the extraction chamber 12 and the rotor casing 3 and at the forward rotation direction R1 side of the extraction nozzle 14, is formed so as to become gradually smaller toward the rearward rotation direction R2 of the rotor 2. In other words, the shape of the casing of the extraction chamber 12 at the forward rotation direction R1 side of the extraction nozzle 14 is formed so as to provide a flow passage area becoming gradually smaller toward the rearward rotation direction R2.

The inner circumferential surface of the extraction nozzle 14 and the radially-outward surface 18 of the extraction chamber 12 are connected with a smooth curved surface 19 that is convex toward the flow passage side of the air A. In other words, the connection portion between the inner circumferential surface of the extraction nozzle 14 and the radially-outward surface 18 of the extraction-chamber casing 6 is chamfered so as to have a round surface that is convex toward the flow passage side of the air A. That is, between the inner circumferential surface of the extraction nozzle 14 and the radially-outward surface 18 of the extraction-chamber casing 6, the corner portion in which the inner circumferential surface of the extraction nozzle 14 is orthogonal to the radially-outward surface 18 of the extraction-chamber casing 6 is not formed, and is smoothly connected.

The air A which has flowed to the extraction chamber 12 through the communication passage 13 becomes to a flow that swirls toward the forward rotation direction R1 of the rotor 2. The flow rate of the air A is reduced in a region at the side of the extraction nozzle 14 in the forward rotation direction R1 of the rotor 2. While on the other hand, the flow rate of the air A is increased in a region at the side of the extraction nozzle 14 in the rearward rotation direction R2 of the rotor 2.

According to the above embodiment, the flow passage area at the side of the extraction nozzle 14 in the forward rotation direction R1 of the rotor 2 was formed small so as to correspond to the decrease in the flow rate of the fluid, and the flow passage area at the side of the extraction nozzle 14 in the rearward rotation direction R2 was formed large so as to correspond to the increase in the flow rate of the fluid. Accordingly, the unevenness of the flow rate of the fluid in the vicinity of the extraction nozzle 14 can be reduced, and the stalling of the flow generated in the vicinity of the tip of the blade 8 can be prevented. By the stalling being prevented, the surge generated in an entire flow of the fluid is prevented, and the reduction of the operation efficiency of the compressor 1 can be suppressed.

Since the unevenness of the fluid caused by the extraction nozzle 14 is reduced, the number of the extraction nozzles 14 can be reduced, and thus weight of the compressor 1 and the production cost thereof can be reduced.

Also, since the shape of the casing of the extraction chamber 12 is formed so as to correspond to the flow rate of the air A, the evenness of the flow rate of the air A can be further improved.

Also, since the inner circumferential surface of the extraction nozzle 14 and the radially-outward surface 18 of the extraction chamber 12 are connected with a smooth curved surface 19 that is convex toward the flow passage side of the air A, a flaking of the air A flowing through the extraction chamber 12 can be prevented, and the air A can be smoothly introduced to the extraction nozzle 14.

As described in the above, the embodiment of the present invention has been described in detail with reference to the accompanying drawings; however, the configurations and the combinations of them in the respective embodiments are merely an example, and therefore, additions of the configuration, omissions thereof, replacement thereof, and other changes are possible within the scope that do not depart from the spirit of the invention. Also, the present invention is not limited to the embodiment, but is only limited by the scope of the claims.

According to the above embodiment, the flow passage area at the side of the extraction nozzle 14 in the forward rotation direction R1 of the rotor 2 is reduced, and the flow passage area at the side of the extraction nozzle 14 in the rearward rotation direction R2 is increased; however it is not limited thereto. For example, it is possible to merely reduce the flow passage area at the side of the extraction nozzle 14 in the forward rotation direction R1 of the rotor 2. While on the other hand, it is possible to merely increase the flow passage area at the side of the extraction nozzle 14 in the rearward rotation direction R2.

Also, the above embodiment shows that two extraction nozzles 14 are provided; however, the number of the extraction nozzles 14 is not limited thereto.

FIELD OF INDUSTRIAL APPLICATION

The present invention is a compressor provided with a rotor that rotates about an axis and a casing surrounding the rotor, and the present invention is possible to apply to a compressor having an extraction structure for guiding a part of the gas compressed by the rotor to the outside of the compressor.

DESCRIPTION OF REFERENCE SIGNS

1: Compressor
2: Rotor
3: Rotor casing
4: Main flow passage
5: Rotor body
6: Extraction-chamber casing
7: Blade stage
8: Blade 9: Vane stage
10: Vane
12: Extraction chamber
13: Communication passage
14: Extraction nozzle
15: Extraction pipe
16: Flow rate control valve
17: Radially-inward surface
18: Radially-outward surface
19: Smooth curved surface
20: Combustor
21: Turbine
22: Rotor
23: Casing
24: Main flow passage
R: Rotation direction
R1: Forward rotation direction
R2: Reward rotation direction

What is claimed is:

1. A compressor comprising:
a rotor configured to rotate about an axis thereof;
a rotor casing surrounding the rotor from an outer circumferential side of the rotor and defining a main flow passage of a fluid between the rotor and the rotor casing;
an extraction-chamber casing at an outer circumferential side of the rotor casing, and the extraction-chamber casing defining an extraction chamber in communication with the main flow passage between the rotor casing and the extraction-chamber casing; and
an extraction nozzle connected to the extraction-chamber casing from an outer circumferential side of the extraction-chamber casing and configured to guide the fluid inside the extraction chamber to an outside of the compressor,
wherein, in a connection portion at an upstream end of the extraction nozzle between an inner circumferential surface of the extraction nozzle and an outer circumferential surface of the extraction chamber in a radial direction of the rotor, at least an upstream side of the extraction nozzle is connected with a smooth curved surface such that the connection portion is chamfered therebetween so as to have a round surface, wherein the round surface is in contact with fluid along the round surface, and wherein the round surface is convex in a direction facing the fluid along the round surface, and wherein a gap in the radial direction of the rotor between the extraction-chamber casing and the rotor casing is larger at a first side of a position of the extraction nozzle in a rearward rotation direction of the rotor than at a second side of the position of the extraction nozzle in a forward rotation direction of the rotor, wherein the compressor is an axial compressor.

2. The compressor according to claim 1, wherein
the gap, in the radial direction of the rotor between the extraction-chamber casing and the rotor casing and at a side of the extraction nozzle in the rearward rotation direction of the rotor, is defined so as to be larger toward the forward rotation direction of the rotor.

3. The compressor according to claim 1, wherein
the gap, in the radial direction of the rotor between the extraction-chamber casing and the rotor casing and at a side of the extraction nozzle in the forward rotation direction of the rotor, is defined so as to be smaller toward the rearward rotation direction of the rotor.

4. A gas turbine comprising:
the compressor according to claim 1, the compressor being configured to compress air as the fluid by a rotation of the rotor;
a combustor configured to generate combustion gas by burning fuel in compressed air compressed by the compressor; and
a turbine configured to be driven by the combustion gas from the combustor.

5. The compressor according to claim 1, wherein
the extraction nozzle extends along a radially-outward side of the rotor from the extraction chamber toward the radially-outward side of the rotor, in a cross-sectional view perpendicular to the axis of the rotor.

6. The compressor according to claim 1, wherein
the gap is largest at the first side of the position of the extraction nozzle in the rearward rotation direction of the rotor, and
the gap is smallest at the second side of the position of the extraction nozzle in the forward rotation direction of the rotor.

7. The compressor according to claim 1, wherein
a communication passage is defined: (i) in an annular shape centered around the axis of the rotor, (ii) between the main flow passage and the extraction chamber, and (iii) at a radially-inward side of the extraction chamber.

* * * * *